United States Patent
Sareshwala

[19]

[11] Patent Number: 6,131,964
[45] Date of Patent: Oct. 17, 2000

[54] SAS FITTING FOR TUBE AND PIPE CONNECTIONS

[75] Inventor: Sohel A. Sareshwala, Union City, Calif.

[73] Assignee: Westinghouse Air Brake Company, Wilmerding, Pa.

[21] Appl. No.: 09/211,827

[22] Filed: Dec. 15, 1998

[51] Int. Cl.[7] .............................. F16L 13/14; F16L 19/04; F16L 19/08

[52] U.S. Cl. .................. 285/382; 285/382.2; 285/382.1; 285/382.7; 285/417

[58] Field of Search ................................ 285/382.2, 382, 285/382.1, 382.7, 417

[56] References Cited

U.S. PATENT DOCUMENTS

| | | | |
|---|---|---|---|
| 3,699,625 | 10/1972 | Spencer et al. | 29/508 |
| 3,762,059 | 10/1973 | Dawson | 285/382.2 |
| 4,061,367 | 12/1977 | Moebius | 285/382.2 |
| 4,114,930 | 9/1978 | Perkins et al. | 285/382 |
| 4,482,174 | 11/1984 | Puri | 285/382.2 |
| 5,110,163 | 5/1992 | Benson et al. | 285/382.2 |
| 5,423,581 | 6/1995 | Salyers | 285/382 |
| 5,470,113 | 11/1995 | Schwalm et al. | 285/382.2 |

FOREIGN PATENT DOCUMENTS

| | | | |
|---|---|---|---|
| 9000483 | 2/1992 | WIPO | 285/382.2 |

Primary Examiner—Terry Lee Melius
Assistant Examiner—Tomlyne A Malcolm
Attorney, Agent, or Firm—James Ray & Associates

[57] ABSTRACT

The present invention provides an apparatus for making a tube connection. The apparatus comprises a sleeve having an interior surface adapted for receiving a tube section therein. The sleeve further has an exterior surface having a locking mechanism disposed on an outer portion thereon, such outer portion has a first end and a second end. There is an upwardly inclined surface extending from such second end of such outer portion of the sleeve. Extending inwardly from the upwardly inclined surface is a generally cylindrical sleeve wall that is substantially parallel to a longitudinal axis extending through the sleeve from one end to another. There is further a stop flange disposed on a center portion of such sleeve extending radially outwardly from such center portion of such sleeve, such stop flange is disposed substantially adjacent such generally cylindrical sleeve wall. Such apparatus further includes a driver mechanism for engaging and deforming the sleeve and concurrently such tube section engaged within the sleeve. The driver mechanism has at least two cylindrical sections for engaging the exterior surface of the sleeve. A first end of the driver contacts such stop flange of the center portion of the sleeve and a second end engages the locking mechanism of the outer portion of the sleeve. Such sleeve also includes an anti-torque surface treatment on the inner surface of the ends to resist torsion of the tube.

26 Claims, 6 Drawing Sheets

SAS FITTING FOR TUBE AND PIPE CONNECTIONS

FIELD OF THE INVENTION

The present invention is related, in general, to an apparatus which allows pipes or tubes to be joined and sealed together with a mechanical fitting and, more particularly, the present invention relates to a connector having no reverse taper.

BACKGROUND OF THE INVENTION

There are a variety of mechanical fittings currently available to provide for coupling two sections of pipes or tubes together and providing a leak-tight seal. Prior to the introduction of these mechanical devices the majority of these connections were made by welding, soldering or braising the ends of these pipe or tubing sections together. Needless to say the advent of these mechanical fittings reduced the time and cost of joining tubes together.

Most of these devices provide for a sleeve or a coupling body which hold the tube or pipe therein and a swage ring or driver that slides over and deforms the sleeve so as to provide a mechanical seal between the sleeve and the tubing.

However, usage and bending of the tubing may cause the swage or locking mechanism to "back off" the coupling body and the leak-tight seal may be broken. Various methods have been employed in an attempt to solve this problem. The present invention provides for a new locking mechanism and a coupling body without a reverse taper.

SUMMARY OF THE INVENTION

The present invention provides an apparatus for making a tube/pipe connection. The apparatus comprises a sleeve having an interior surface that is adapted for receiving a tube/pipe section therein. The sleeve further has an exterior surface having a locking mechanism disposed on an outer portion thereof, such outer portion has a first end and a second end. There is an upwardly inclined surface extending from such second end of such outer portion of the sleeve. Extending inwardly from the upwardly inclined surface is a generally cylindrical sleeve wall that is substantially parallel to a longitudinal axis extending through the sleeve from one end to another. Such generally cylindrical sleeve wall does not have an incline and does not have a decline. There is further a stop flange disposed on a center portion of such sleeve extending radially outwardly from such center portion of such sleeve, such stop flange is disposed substantially adjacent such generally cylindrical sleeve wall. Such apparatus further includes a driver mechanism for engaging and deforming the sleeve and concurrently such tube section engaged within the sleeve. The driver mechanism has at least two cylindrical sections for engaging the exterior surface of the sleeve. A first end of the driver contacts such stop flange of the center portion of the sleeve and a second end is lockingly engaged with the locking mechanism on the outer portion of the sleeve.

OBJECTS OF THE INVENTION

It is, therefore, one of the primary objects of the present invention to provide a mechanism for connecting tubes or pipes which will prevent the mechanism from loosening or backing out when the tube or the fitting is bent, pulled or stressed.

Another object of the present invention is to provide a mechanism for connecting tubes or pipes which will make the manufacturing process easier and thus reduce costs.

Still another object of the present invention is to provide a mechanism for connecting tubes or pipes which will provide a better locking arrangement.

Yet another object of the present invention is to provide a mechanism for connecting tubes or pipes in which such mechanism does not have a reverse taper.

It is an additional object of the present invention to provide a mechanism for connecting tubes or pipe sections which incorporates an anti-torque feature to resist torsion of the pipe or tube.

In addition to the objects and advantages of the present invention which have been described in detail above, various other objects and advantages will become readily apparent to those persons skilled in tube/pipe fittings and more particularly in mechanisms for joining tube or pipe sections together from the following more detailed description of such invention particularly when such description is taken in conjunction with the attached drawing Figures and with the appended claims.

Figure 1:
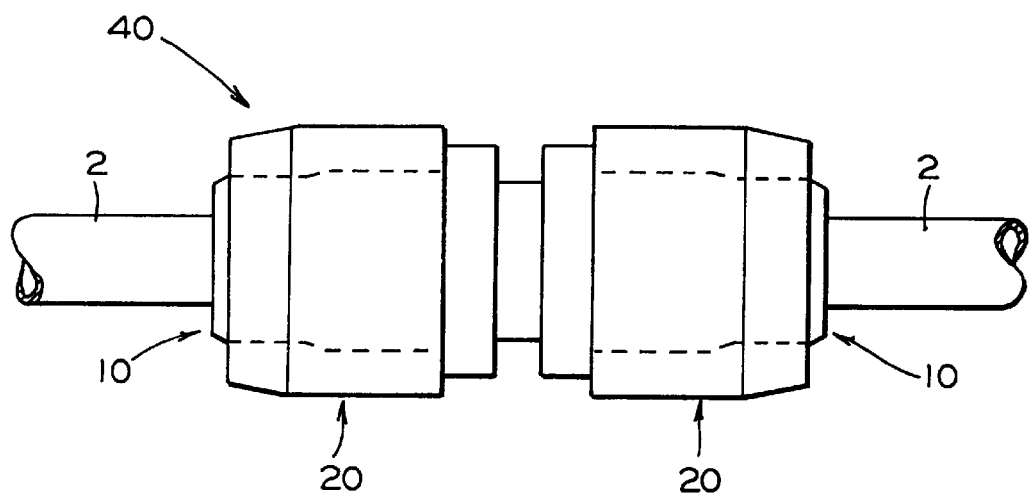
FIG. 1 is a plan view of an embodiment of the invention showing the driver, the coupling body with sections of tubing therein.

BRIEF DESCRIPTION OF THE PRESENTLY PREFERRED AND VARIOUS ALTERNATE EMBODIMENTS OF THE INVENTION

Prior to proceeding to the more detailed description of the present invention, it should be noted that for the sake of clarity in understanding the invention, identical components with identical functions have been designated with identical reference numerals throughout the drawing Figures.

Reference is now made more specifically to FIG. 1. Illustrated therein is a plan view of an embodiment of the invention showing the complete coupling apparatus, generally designated 40. The apparatus 40 includes a driver, generally designated 20, and a coupling body, generally designated 10, which has a hollow interior to allow tube section 2 to easily slide therein initially.

Figure 2:
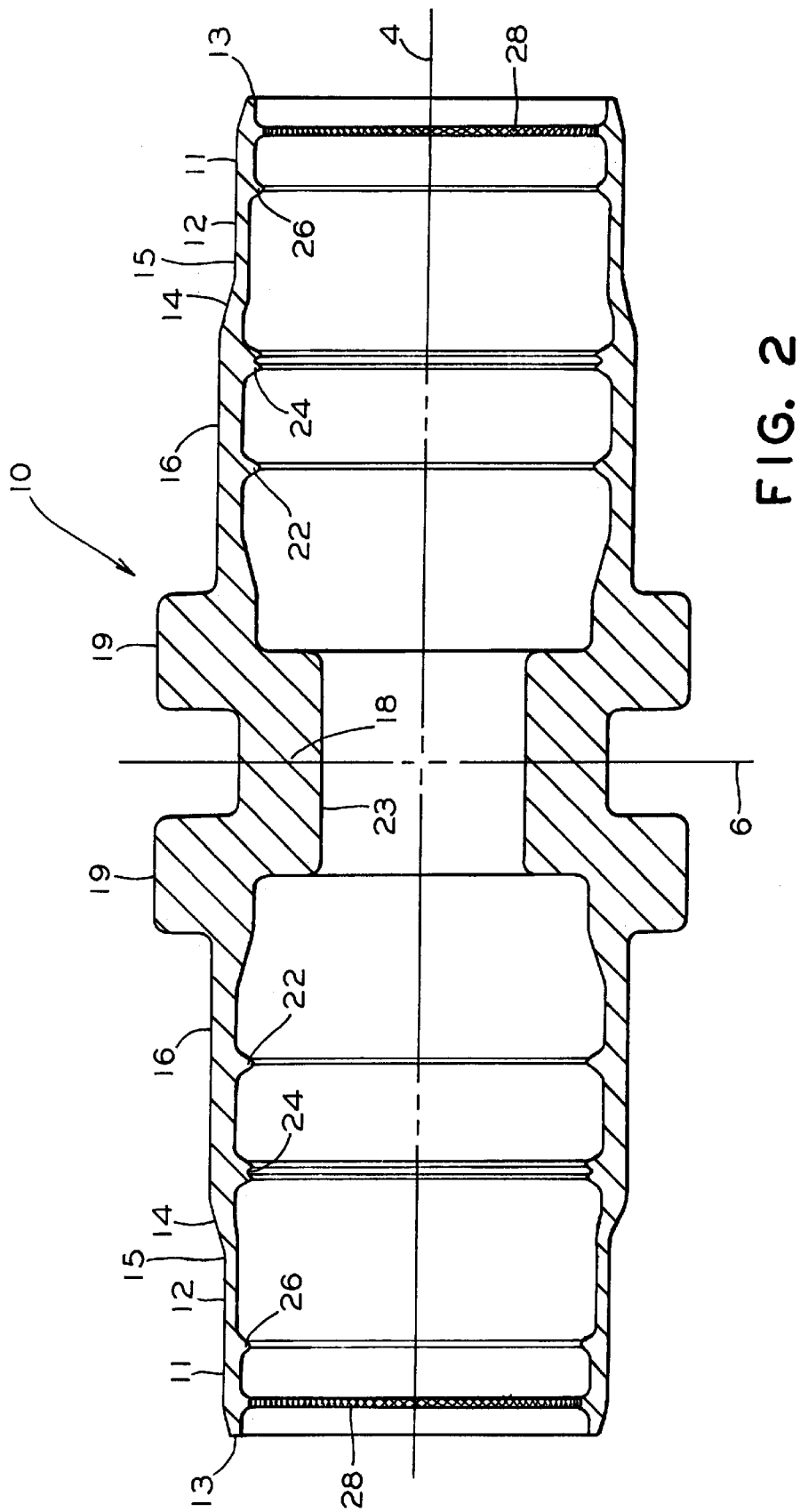
FIG. 2 is a partial cross-sectional view of a coupling body showing one embodiment of the invention prior to the driver being urged over the coupling body.

Reference is now made to FIG. 2. Illustrated therein is a partial cross sectional view of coupling mechanism 10, for coupling two sections of tubing 2 together. Tube 2 or tubing as used herein is meant to include tubes, pipe or other conduits. All of these will be collectively referred to as tubes hereinafter.

Such coupling mechanism 10 is also called a sleeve and hereinafter such coupling mechanism 10 will be referred to as sleeve 10.

Figure 3:
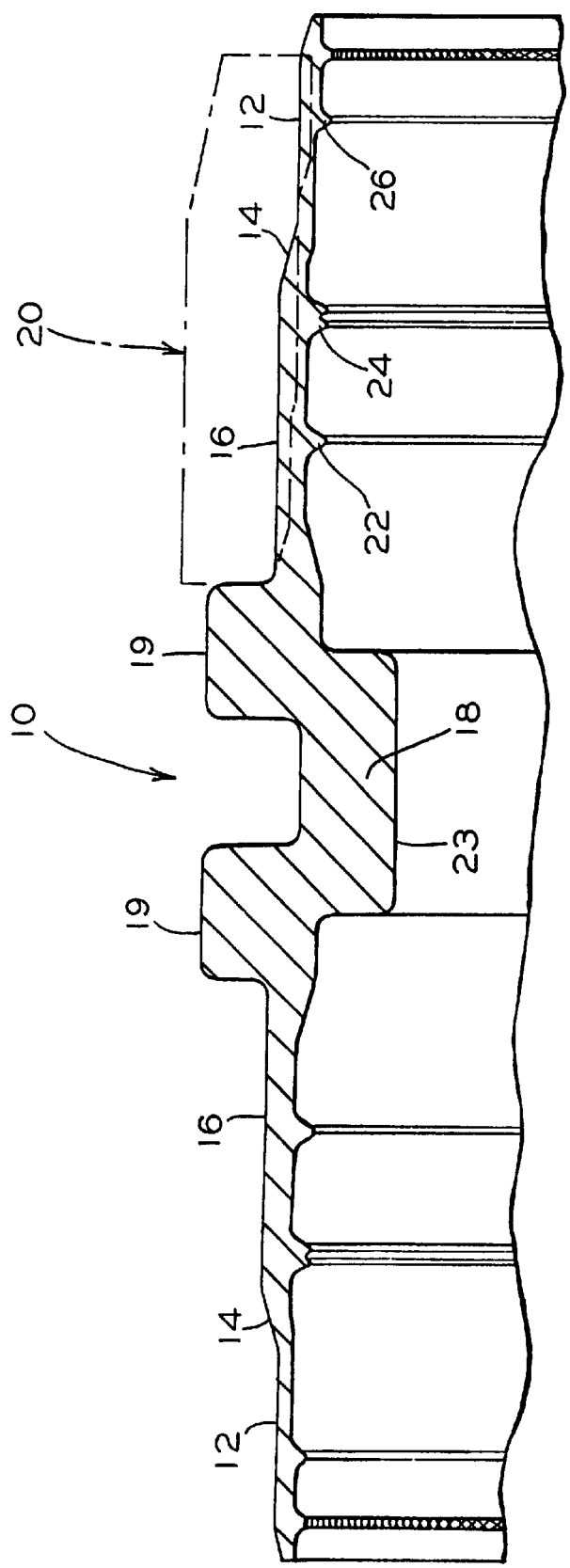
FIG. 3 shows a partial cross-sectional view of a coupling body showing one embodiment of the invention and a driver being urged over one section of the coupling body.
Figure 4:
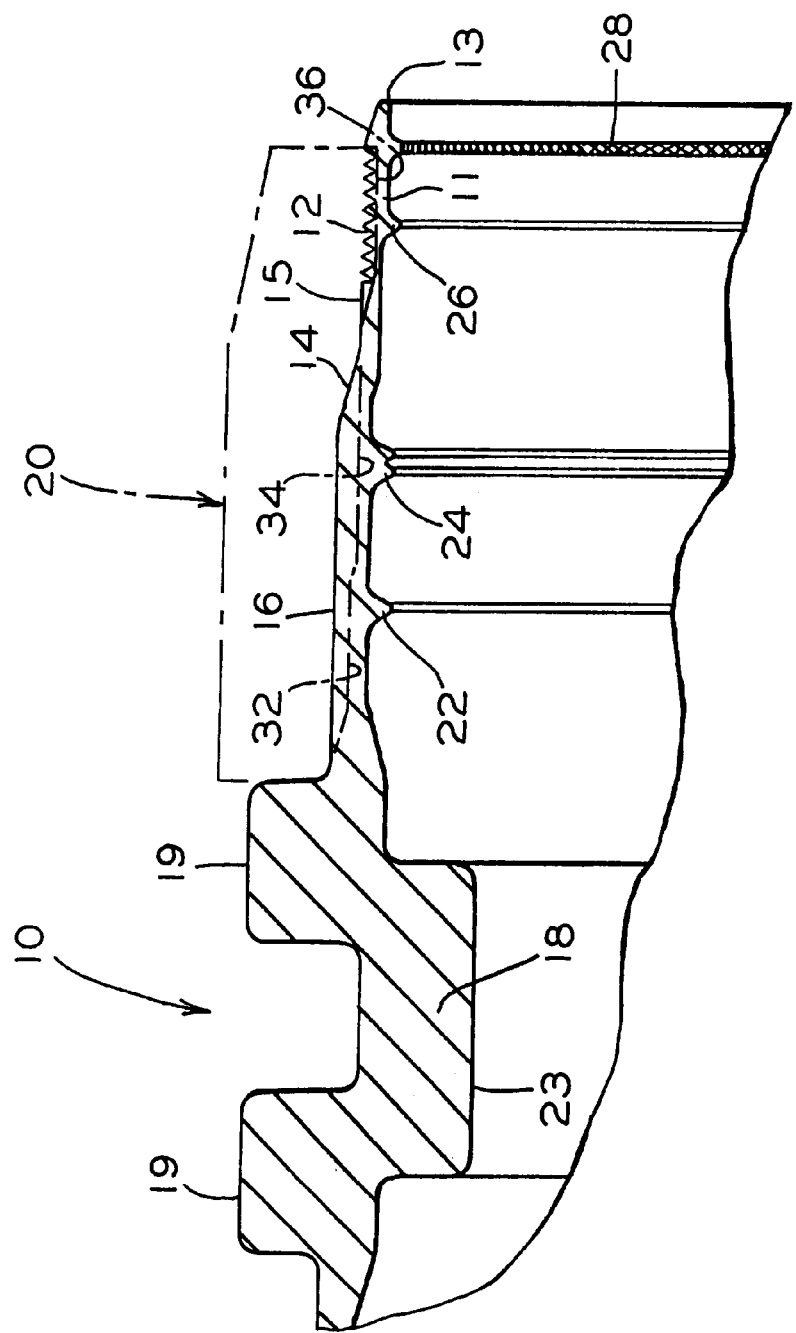
FIG. 4 shows an enlarged partial cross-sectional view of one section of the coupling body and a driver being urged over the coupling body.
Figure 5:
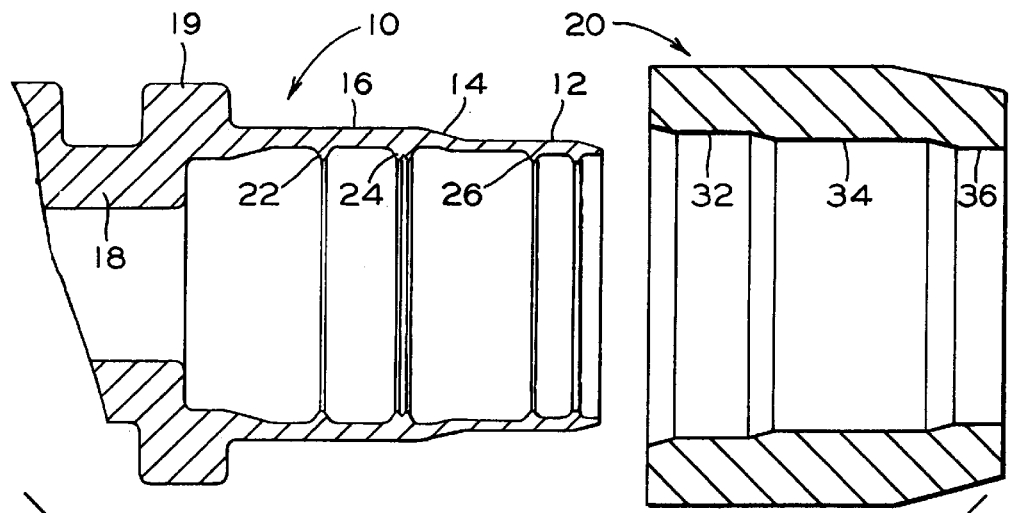
FIG. 5 shows a cross sectional view of one section of a coupling body showing the non-reverse taper and a cross sectional view of a driver before the units are assembled.
Figure 6:
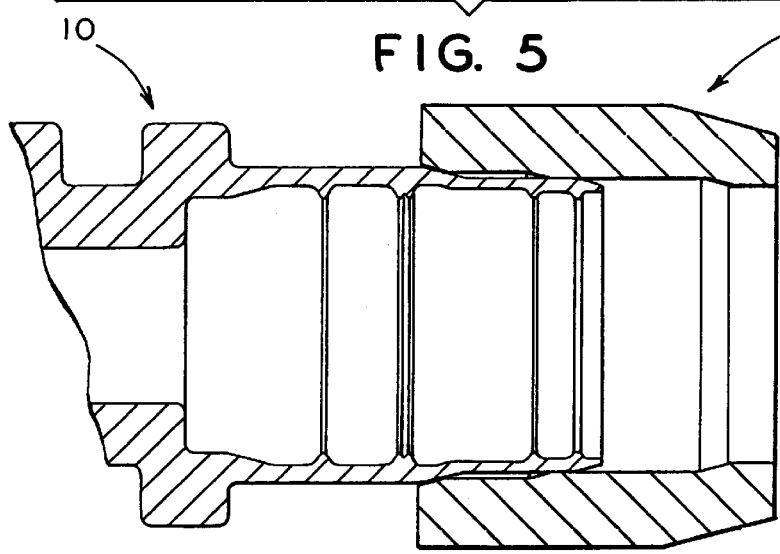
FIG. 6 shows a cross sectional view of one section of a coupling body showing the non-reverse taper and a cross sectional view of a driver as the sections are being assembled.
Figure 7:
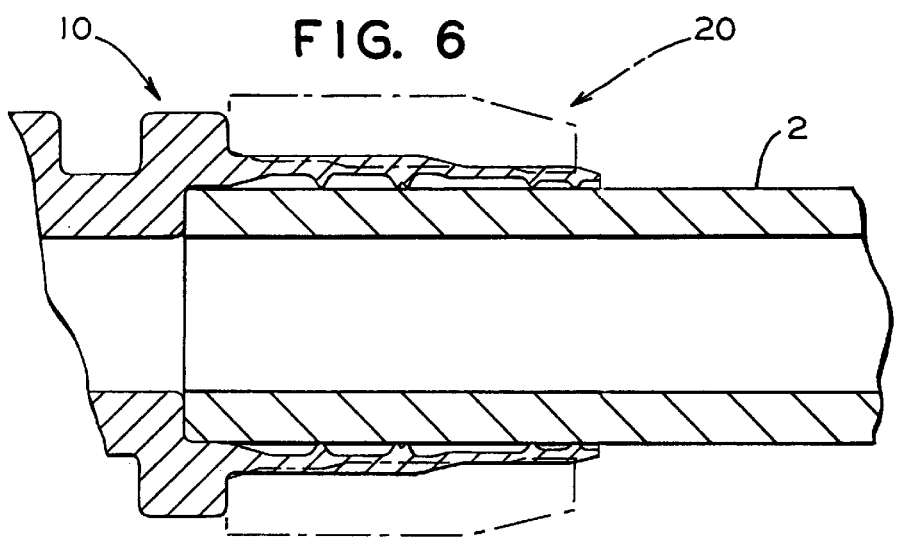
FIG. 7 shows a cross sectional view of one section of a coupling body showing the non-reverse taper and a cross sectional view of a driver after the sections are assembled with a section of tubing installed.

The sleeve 10 of FIG. 2 is shown in a cross-sectional view taken through a diameter of the sleeve 10 prior to the driver 20 being urged over the ends. The driver 20, shown in FIGS. 3–5, causes deformation of the sleeve 10 such that the sleeve 10 bites into and secures the two tubes 2 together. It can be seen that not only is the sleeve 10 symmetrical about longitudinal axis 4 but it is similarly symmetrical about radial axis 6. Thus, the following discussion which may only describe the portion of sleeve 10 which lies above the longitudinal axis 4 and to the right of radial axis 6, applies equally to all similarly shaped portions of sleeve 10.

Sleeve 10 has an interior surface for receiving tube 2 and an exterior surface. Such exterior surface includes a locking mechanism 12 that is disposed on an outer portion 11 of such sleeve 10. Such outer portion 11 has a first end 13 and a second end 15. In a preferred embodiment of the invention such locking mechanism 12 consists of a knurled surface, a series of teeth like projections, which when the driver 20 is urged over such sleeve 10 locks such driver 20 in position. Such knurled surface of locking mechanism 12 is evident in FIG. 4. Extending inwardly from such second end 15 of sleeve 10 is an upwardly inclined surface 14. Extending inwardly from the upwardly inclined surface 14 is a generally cylindrical sleeve wall 16.

The generally cylindrical sleeve wall 16, unlike the reverse taper of U.S. Pat. No. 4,482,174, is substantially parallel to such longitudinal axis 4 extending through the body of sleeve 10 from one end to another. Generally cylindrical sleeve wall 16 has neither an incline nor a decline.

There is further a stop flange 19 disposed on a center portion 18 of such sleeve 10 and extending radially outwardly from such center portion 18. Such stop flange 19 is disposed substantially adjacent such generally cylindrical sleeve wall 16. Stop flange 19 limits the movement of driver 20. Stop flange 19 does not include a sloped surface, nor does any other part of the center portion 18 of sleeve 10 have any sloped surface. Such stop flange 19 has a generally rectangular shape having an outer surface that is substantially parallel to an axis extending through the sleeve from one end to another and having sides that are substantially perpendicular to such longitudinal axis. As mentioned previously, the above description would also apply to the other similar portions of the sleeve 10.

The interior surface of sleeve 10 is adapted for receiving a tube 2. Such interior surface of such center portion 18 of such sleeve 10 has an internally extending positioning flange 23. Such positioning flange 23 limits the insertion of tube 2 within sleeve 10.

Figure 9:
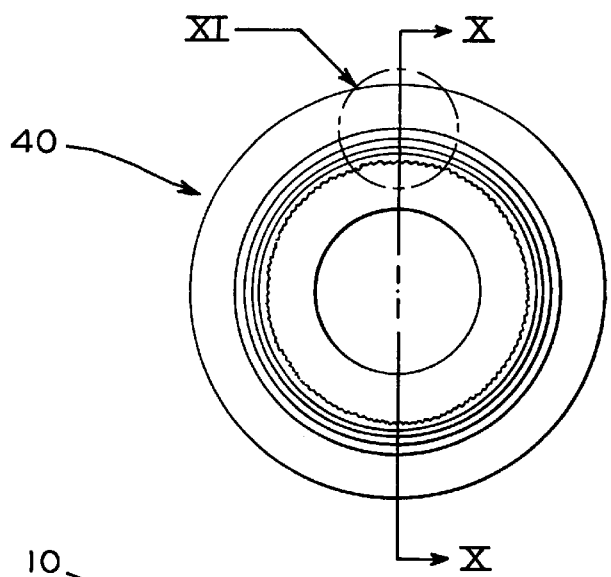
FIG. 9 shows a view of the SAS fitting looking into the end of the fitting.
Figure 10:
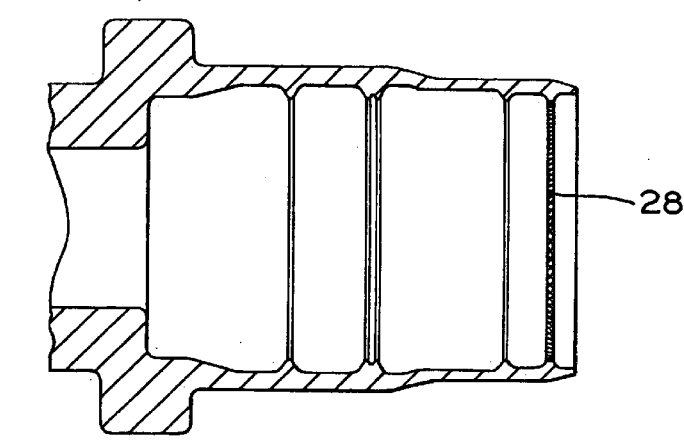
FIG. 10 is a cross-sectional view of FIG. 9 taken across the lines X—X.
Figure 11:
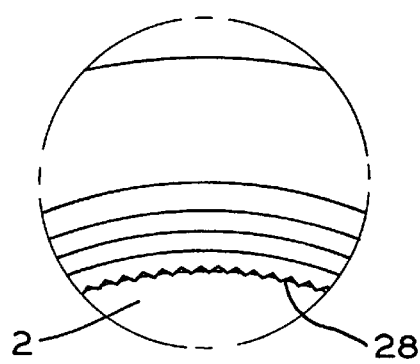
FIG. 11 is an enlarged view of the area XI of FIG. 9 showing the deformation of the pipe with the anti-torque knurling.

In a presently preferred embodiment of the invention, such interior surface of sleeve 10 further includes a plurality of projections or sealing teeth. In a preferred embodiment of the invention such plurality of sealing teeth includes an inboard seal 22, a main seal 24 and an outboard seal 26. When driver 20 is urged longitudinally over sleeve 10, these projections or sealing teeth press into tube 2, deform tube 2 and secure tube 2. The interior surface of such first end 13 of the outer portion 11 of sleeve 10 includes a surface treatment 28 for holding such tube 2 in place. In a preferred embodiment of the invention such surface treatment is an anti-torque knurling 28 which further secures tube 2. The anti-torque knurling 28 feature allows the fitting to resist torsion of the tube/pipe. Reference is now made to FIGS. 9–11. Illustrated therein is a more detailed view of such anti-torque knurling 28 showing the deformation of the pipe with the anti-torque knurling 28.

Reference is now made to FIGS. 3 through 7 in which a driver 20 is shown in relation to sleeve 10. Driver 20 can also be referred to as a swage ring. The interior surface of such driver 20 in the present invention has at least two cylindrical sections. In a presently preferred embodiment of the invention such driver 20 has three cylindrical sections, 32, 34 and 36, one each for such sealing teeth 22, 24 and 26.

A tube connection is made by sliding tube section 2 in sleeve 10. Initially, tube 2 slides easily into sleeve 10 up to positioning flange 23 which restricts further movement of tube 2 within sleeve 10. As such driver 20 is urged longitudinally over sleeve 10, it causes sleeve 10 to be deformed and concurrently causes tube 2 to also deform. Such driver 20 deforms sleeve 10 and forces inboard seal 22, main seal 24 and outboard seal 26 into the exterior surface of tube 2 and thus deforms tube 2. Because of the configuration of the cylindrical sections 32, 34 and 36 on such driver 20, there is less deformation of sleeve 10, and consequently tube 2, near the center of the sleeve and the deformation is the greatest in the outer portion 11, which includes locking mechanism 12, of such sleeve 10.

Figure 8:
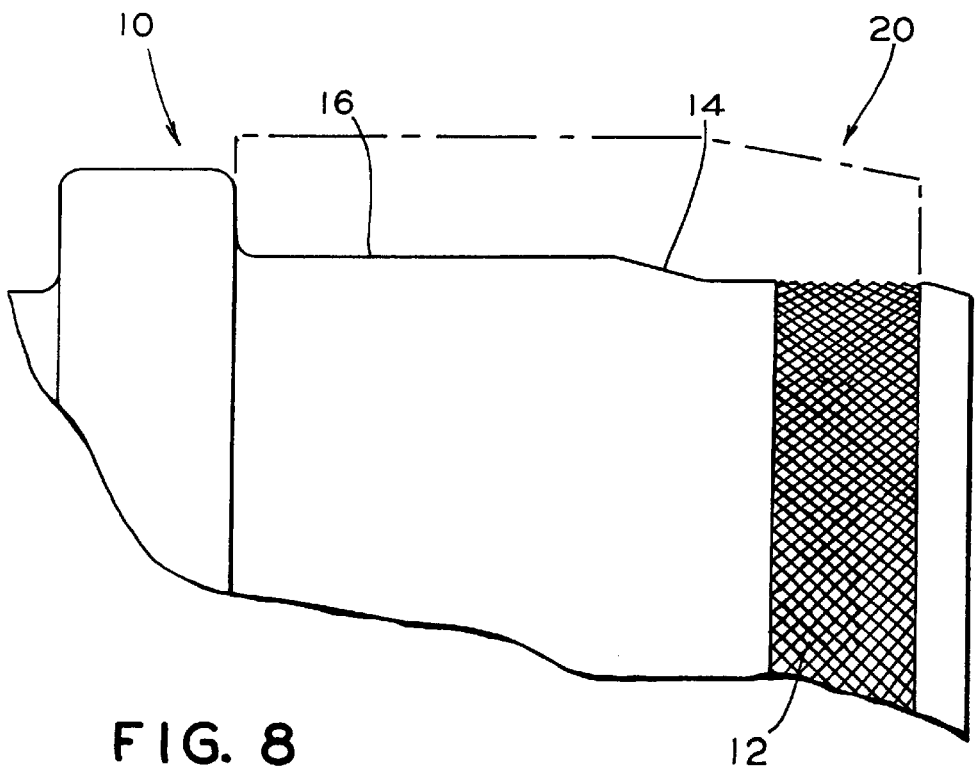
FIG. 8 is an enlarged view showing detail of the locking mechanism.

The driver locking mechanism 12 of sleeve 10 locks the first end of driver 20 in position after installation. The second end of driver 20 abuts against stop flange 19 of the center portion 18 of sleeve 10. The locking mechanism 12 of the sleeve 10 works well in securing drivers even when drivers have been made by a cold forming process. FIG. 8 shows an enlarged view of the locking mechanism 12 on the outer surface of such sleeve 10. In a preferred embodiment of the invention such locking mechanism 12 is a cross hatch pattern. This cross hatch pattern causes cold welding with the inside of the driver 20.

The generally cylindrical sleeve wall of the present invention makes the manufacturing process and quality check points easier, thereby reducing costs of such tube connector. Further, the locking mechanism and knurled anti-torque features create a joining mechanism that meets and exceeds performance requirements of a mechanically attached fitting.

While a presently preferred embodiment of the present invention has been described in detail above, it should be understood that various other adaptations and/or modifications of the invention can be made by those persons who are particularly skilled in the art related to tube and pipe connectors without departing from either the spirit of the invention or the scope of the appended claims.

I claim:

1. An apparatus for making a tube connection, said apparatus comprising:

(a) a sleeve having an interior surface adapted for receiving a tube section therein and an exterior surface, said exterior surface including;

(i) a locking mechanism disposed on an outer portion of said exterior surface of said sleeve, said outer portion having a first end and a second end, (ii) an upwardly inclined surface extending inwardly from said second end of said outer portion, (iii) a generally cylindrical sleeve wall that is substantially parallel to a longitudinal axis extending through said sleeve from one end to another, said generally cylindrical sleeve wall extending continuously inwardly from said upwardly inclined surface to a stop flange, (iv) said stop flange disposed substantially adjacent said generally cylindrical sleeve wall and extending radially outwardly from said exterior surface of said sleeve; and (b) a driver mechanism for engaging and deforming said sleeve and concurrently such tube section engaged within said sleeve when said driver is forced longitudinally along said exterior surface of said sleeve, said driver mechanism having at least two cylindrical sections for engaging said exterior surface of said sleeve, a first one of said at least two cylindrical sections of said driver being lockingly engaged by said locking mechanism of said outer portion of said sleeve and a second one of said at least two cylindrical sections of said driver engaging said generally cylindrical sleeve wall of said sleeve, a first face end of said driver contacting said stop flange of said sleeve.

2. An apparatus for making a tube connection, according to claim 1, wherein said locking mechanism is knurled.

3. An apparatus for making a tube connection, according to claim 2, wherein said knurled locking mechanism has a cross hatch pattern.

4. An apparatus for making a tube connection, according to claim 1, wherein said interior surface of said sleeve further includes a positioning flange extending radially inwardly for limiting a longitudinal movement of such tube within said sleeve.

5. An apparatus for making a tube connection, according to claim 1, wherein said interior surface of said sleeve further includes a plurality of tooth like projections extending radially inwardly for sealing such tube within said sleeve.

6. An apparatus for making a tube connection, according to claim 5, wherein said plurality of tooth like projections on said interior surface of said sleeve includes at least one tooth like projection extending radially inwardly as an outboard seal, said at least one tooth like projection being disposed on said interior surface closely adjacent said outer portion of said exterior surface of said sleeve.

7. An apparatus for making a tube connection, according to claim 5, wherein said plurality of tooth like projections on said interior surface of said sleeve includes at least one tooth like projection extending radially inwardly as an inboard seal, said at least one tooth like projection being disposed on said interior surface closely adjacent a mid point of said generally cylindrical sleeve wall of said exterior surface of said sleeve.

8. An apparatus for making a tube connection, according to claim 5, wherein said plurality of tooth like projections on said interior surface of said sleeve includes at least one tooth like projection extending radially inwardly as a main seal, said at least one tooth like projection being disposed on said interior surface closely adjacent a point where said generally cylindrical sleeve wall of said exterior surface joins said upwardly inclined surface of said exterior surface of said sleeve.

9. An apparatus for making a tube connection, according to claim 5, wherein said at least two cylindrical sections of said driver mechanism provide for sealing said tooth like projections on said interior surface of said sleeve into such tube.

10. An apparatus for making a tube connection, according to claim 1, wherein said at least two cylindrical sections of said driver mechanism includes three cylindrical sections.

11. An apparatus for making a tube connection, according to claim 1, wherein said interior surface of said outer portion of said sleeve closely adjacent said first end of said outer portion of said sleeve further includes a surface treatment for resisting torsion of such tube.

12. An apparatus for making a tube connection, according to claim 11, wherein said surface treatment of said interior surface is anti-torque knurling.

13. An apparatus for making a tube connection, according to claim 1, wherein said stop flange of said sleeve has a generally rectangular shape having an outer surface that is generally on a plane that is substantially parallel to said axis extending through said sleeve from one end to another and having sides that are substantially perpendicular to said axis.

14. An apparatus for making tube connections, said apparatus comprising:

(a) a sleeve having a first end, a center portion and a second end and having an interior surface of each of said first end and said second end adapted for receiving a tube section therein and an exterior surface on each of said first end and said second end, said exterior surface including;

(i) a locking mechanism disposed on an outer portion of said exterior surface of said first end and said second end of said sleeve, said outer portion of said sleeve having a first end and a second end, (ii) an upwardly inclined surface extending inwardly from said second end of said outer portion of said first end and said second end of said sleeve, (iii) a generally cylindrical sleeve wall that is substantially parallel to a longitudinal axis extending through said sleeve from one end to another, said generally cylindrical sleeve wall extending continuously inwardly from said upwardly inclined surface of said exterior surface of said first end and said second end of said sleeve, to a stop flange, (iv) said stop flange disposed substantially adjacent said generally cylindrical sleeve wall of said first end and said second end of said sleeve and extending radially outwardly from said exterior surface of said sleeve; and (b) a driver mechanism having a first part and a second part for engaging and deforming said first end and said second end of said sleeve and concurrently such tube sections engaged therein when said first part and said second part of said driver are forced longitudinally along said exterior surface of said first end and said second end of said sleeve, said driver mechanism having at least two cylindrical sections in each of said first part and said second part for engaging said exterior surface of said first end and said second end of said sleeve, a first one of said at least two cylindrical sections of each of said first part and said second part of said driver being lockingly engaged by said locking mechanism of said outer portion of said first end and said second end of said sleeve and a second one of said at least two cylindrical sections of each of said first part and said second part of said driver engaging said generally cylindrical sleeve wall of said first end and said second end of said sleeve, a first face end of each of said first part and said second part of said driver contacting said stop flange of said first end and said second end of said sleeve, respectively.

15. An apparatus for making tube connections, according to claim 14, wherein said locking mechanism is knurled.

16. An apparatus for making tube connections, according to claim 15, wherein said knurled locking mechanism has a cross hatch pattern.

17. An apparatus for making tube connections, according to claim 14, wherein said interior surface of said sleeve further includes a positioning flange in said center portion of said sleeve extending radially inwardly for limiting a longitudinal movement of such tube within said first end and said second end of said sleeve.

18. An apparatus for making tube connections, according to claim 14, wherein said interior surface of said first end and said second end of said sleeve further includes a plurality of tooth like projections extending radially inwardly for sealing such tube within said sleeve.

19. An apparatus for making tube connections, according to claim 18, wherein said plurality of tooth like projections on said interior surface of said first end and said second end of said sleeve includes at least one tooth like projection extending radially inwardly as an outboard seal, said at least one tooth like projection being disposed on said interior surface closely adjacent said outer portion of said exterior surface of said first end and said second end of said sleeve.

20. An apparatus for making tube connections, according to claim 18, wherein said plurality of tooth like projections on said interior surface of said first end and said second end of said sleeve includes at least one tooth like projection extending radially inwardly as an inboard seal, said at least one tooth like projection being disposed on said interior surface of said first end and said second end of said sleeve closely adjacent a mid point of said generally cylindrical sleeve wall of said exterior surface of said first end and said second end of said sleeve.

21. An apparatus for making tube connections, according to claim 18, wherein said plurality of tooth like projections on said interior surface of said first end and said second end of said sleeve includes at least one tooth like projection extending radially inwardly as a main seal, said at least one tooth like projection being disposed on said interior surface closely adjacent a point where said generally cylindrical sleeve wall of said exterior surface joins said upwardly inclined surface of said exterior surface of said first end and said second end of said sleeve.

22. An apparatus for making tube connections, according to claim 18, wherein said at least two cylindrical sections of said first part and said second part of said driver mechanism provide for sealing said tooth like projections on said interior surface of said first and said second end of said sleeve into such tube engaged therein.

23. An apparatus for making tube connections, according to claim 14, wherein said at least two cylindrical sections of said said first part and said second part of said driver mechanism includes three cylindrical sections.

24. An apparatus for making tube connections, according to claim 14, wherein said interior surface closely adjacent said first end of said outer portion of said first end and said second end of said sleeve further includes a surface treatment for resisting torsion of such tube.

25. An apparatus for making tube connections, according to claim 24, wherein said surface treatment of said interior surface closely adjacent said first end of said outer portion of said first end and said second end of said sleeve is anti-torque knurling.

26. An apparatus for making tube connections, according to claim 14, wherein said stop flange of said first end and said second end of said sleeve has a generally rectangular shape having an outer surface that is generally on a plane that is substantially parallel to said axis extending through said sleeve from one end to another and having sides that are substantially perpendicular to said axis.

* * * * *